UNITED STATES PATENT OFFICE.

HORACE TRUMBULL, OF JERSEY CITY, NEW JERSEY.

IMPROVEMENT IN MANUFACTURE OF FLINT-GLASS.

Specification forming part of Letters Patent No. 29,020, dated July 3, 1860; Reissue No. 1,081, dated November 20, 1860.

*To all whom it may concern:*

Be it known that I, HORACE TRUMBULL, of Jersey City, in the county of Hudson and State of New Jersey, have invented a new and Improved Composition of Matter to be used in the Manufacture of Flint-Glass; and I hereby declare the following to be a full and sufficient description thereof.

The art of glass-making, up to the time of my invention, embraced in the manufacture of flint-glass the following principal ingredients, namely: sand, oxide of lead, alkali, oxide of manganese. Besides these there are several minor ingredients used for special purposes—as oxide of arsenic, oxide of tin, niter, borax, &c. The oxide of lead used may be litharge or red lead, or both mixed. The alkali may be soda or potash. The former is cheaper; but the latter is better, because it makes a whiter glass. The glass made from soda is always inclined to a greenish hue, or to a yellow, or sometimes to a blue, and is much more difficult to clear of its color. The color is very perceptible in articles of thick and heavy glass, which are very often required in the ornamented work of cut glass, while potash, under the same circumstances, gives a whiter and clearer glass. Thus the thickness necessary for fine cut work in potash-glass causes no objection in color on account of the shade of color; but I have found by experiment many times repeated that the use of soda even is not so objectionable in the finest flint-glass if zinc oxide be substituted for the lead oxide, as in this case the glass becomes free from color, or nearly so, and has less veins and striæ than when lead is used.

My invention therefore consists in preparing a new composition of matter for the manufacture of flint-glass, in which the usual ingredient—oxide of lead—is replaced by the oxide of zinc.

It is not alleged that zinc oxide has not been fused with other ingredients to form a glass; but that it has never before been used to replace lead oxide in flint-glass. The oxides of lead make valuable and powerful fluxes, favorable to forming fluid glass. The glass thus made not only flows freely, but when well dosed with oxide of manganese is tolerably free from color. Still, the obtaining of a clear and brilliant white cannot be depended on as a certainty from the use of manganese and lead oxide, for in lead-glass, and especially when the alkali is soda, the natural green or yellow tint is removed by the oxide of manganese. If the oxide of manganese be in excess, the predominating tint is red. If it be too little to neutralize the composition, the tint will be yellow, green, or blue. The chief difficulty in managing the proportions is that with the same relative proportions of manganese we do not always get the same tint of color, arising from the fact that the same weight of the alkaline ingredient does not always contain the same amount of real alkali, and consequently does not contain the same neutralizing power; but the use of zinc oxide in the place of lead oxide considerably relieves the uncertainty of the neutralizing action, and thus we obtain an approximation to a uniformity of tint not hitherto attained by the use of lead oxide. Another quality of glass arising from the use of zinc oxide as a substitute for that of lead is the specific gravity of the mixture is much less in the use of zinc. This diminishes the tendency of the oxide portion of the mixture to gravitate toward the bottom of the pot or crucible, and relieves the operators from the necessity of frequently stirring the mass to keep up a uniformity of consistence. It is also to be noted that the process of stirring but very imperfectly mixes the metal of the glass-pot, so that veins and striæ are frequently found in masses of the glass taken from the pot. Glass made from the substitution of zinc oxide in place of the lead is much freer from veins and striæ, from the absence of great weight in any one of the ingredients used. Another valuable quality in the zinc-glass is that it is harder and receives a higher polish than lead-glass. Lastly, the zinc oxide costs much less than the same weight of lead oxide, and this fact increases very much the value of this improved composition of matter.

The composition which I prefer to use in my flint-glass, although some variation is allowable, to adapt the zinc oxide to the variations in purity of the other ingredients, without deviating from the principle of my invention, is as follows: Pure white sand, six parts; oxide of zinc, four parts; soda, two parts. Make composition of two thousand pounds. Now add to the above white arsenic, two pounds, and oxide of manganese, fourteen ounces. Mix and treat in the usual way for other compositions of glass.

Having now described the proportions and character of my composition for flint-glass, I would remark that I do not claim to be the first to have used zinc oxide to make a glass composition; but

What I claim as my invention, and desire to secure by Letters Patent, is—

The substitution of oxide of zinc for the oxide of lead in the composition of ordinary flint-glass, substantially in the manner and for the purpose herein fully set forth.

September 29, 1860.

HORACE TRUMBULL.

Witnesses:
EDWARD FOWLER,
JAMES MANN.